(12) United States Patent
Naaman (10) Patent No.: US 10,848,564 B2
(45) Date of Patent: Nov. 24, 2020

(54) DEVICE SPECIFIC REMOTE DISABLING OF APPLICATIONS

(71) Applicant: PAYPAL, INC., San Jose, CA (US)

(72) Inventor: Nadav Naaman, Palo Alto, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/379,623

(22) Filed: Apr. 9, 2019

(65) Prior Publication Data

US 2019/0373061 A1    Dec. 5, 2019

Related U.S. Application Data

(63) Continuation of application No. 14/861,969, filed on Sep. 22, 2015, now Pat. No. 10,257,279, which is a continuation of application No. 13/076,057, filed on Mar. 30, 2011, now Pat. No. 9,154,555.

(51) Int. Cl.
*H04L 29/08* (2006.01)
*G06Q 20/40* (2012.01)
*G06Q 20/36* (2012.01)

(52) U.S. Cl.
CPC ......... *H04L 67/125* (2013.01); *G06Q 20/367* (2013.01); *G06Q 20/407* (2013.01); *H04L 67/303* (2013.01); *H04L 67/34* (2013.01)

(58) Field of Classification Search
None
See application file for complete search history.

(56) References Cited

U.S. PATENT DOCUMENTS

| 2003/0046189 A1* | 3/2003 | Asayama | G06F 21/629 |
|  |  |  | 705/14.61 |
| 2006/0282660 A1* | 12/2006 | Varghese | G06Q 20/341 |
|  |  |  | 713/155 |

\* cited by examiner

*Primary Examiner* — Chi H Pham
*Assistant Examiner* — Raul Rivas
(74) *Attorney, Agent, or Firm* — Haynes and Boone, LLP (57) ABSTRACT

Systems and methods are disclosed herein to allow a service provider supporting applications running on a client device to remotely disable the applications, features of the applications, or sessions of the applications running on the client device. The service providers may initiate the disable action automatically upon the detection of certain events on or through the client device without requiring user input. The disable action is specific for the client device. In one embodiment, the service provider collects information associated with the application and with the remote client device that runs the application to conduct one or more transactions with the service provider. The service provider determines from the collected information a feature set of the application to disable on the client device. The service provider disabling remotely the feature set of the application on the client device without affecting any other client devices that run the application.

20 Claims, 4 Drawing Sheets

DEVICE SPECIFIC REMOTE DISABLING OF APPLICATIONS

CROSS REFERENCE TO RELATED APPLICATIONS

This application is a continuation of and claims priority to U.S. patent application Ser. No. 14/861,969, filed Sep. 22, 2015 which is a continuation of U.S. patent application Ser. No. 13/076,057, filed Mar. 30, 2011, which are hereby incorporated by reference in their entirety.

TECHNICAL FIELD

The present disclosure relates generally to transactions between servers and client devices. In particular, the present disclosure relates to methods and systems for servers to remote disable applications or features of applications running on client devices.

BACKGROUND

Client devices such as smart phones are used to conduct financial and other types of secure transactions. For example, users of client devices may make online purchases from online merchants and request that payments for the purchases be made from the users' payment account with a payment service provider such as PayPal, Inc. of San Jose, Calif. To facilitate the purchase or payment transactions, applications running on the client devices may be supported by the payment service provider and used by the users to conduct the transactions. However, there are times when it is desirable to disable the applications, or certain features of the applications, such as when the applications or when certain features are no longer supported by the payment service provider. At other times, it may be desirable to terminate live sessions of the applications running on the client devices. Conventionally, users of the applications are burdened with initiating such action. This need for user intervention creates inconvenience for the users and support problems for the service providers when the users fail to take the action. Accordingly, there is a need for a simple way of disabling applications running on client devices.

BRIEF SUMMARY

Systems and methods are disclosed herein to allow service providers supporting applications running on client devices to remotely disable the applications or parts of the applications without necessarily requiring user input.

In accordance with one or more embodiments of the present disclosure, a method for a service provider processor to remotely disable an application running on a client device is disclosed. The method includes the service provider processor collecting information associated with the application and information associated with a remote client device running the application. The client device runs the application to conduct one or more transactions with the service provider. The method also includes the service provider processor determining from the collected information a feature set of the application to disable on the client device. The method further includes the service provider processor disabling remotely the feature set of the application on the client device without affecting any other client devices that run the application.

In accordance with one or more embodiments of the present disclosure, a server apparatus disclosed. The server apparatus includes a processor and a memory that stores machine-readable instructions for execution by the processor. The server apparatus collects information associated with an application and information associated with a remote client device. The client device runs the application to conduct one or more transactions with the server apparatus over a communication network. The server apparatus also determines from the collected information a feature set of the application to disable on the client device. The server further remotely disables the feature set of the application on the client device over the communication network without affecting any other client devices that run the application.

In accordance with one or more embodiments of the present disclosure, a non-transitory computer readable medium having computer readable code for execution by a processor to perform a method is disclosed. The method includes collecting information associated with an application and information associated with a remote client device running the application. The client device runs the application to conduct one or more transactions with the service provider. The method also includes determining from the collected information a feature set of the application to disable on the client device. The method further includes disabling remotely the feature set of the application on the client device without affecting any other client devices that run the application.

These and other embodiments of the present disclosure will be more fully understood by reference to the following detailed description of the embodiments when considered in conjunction with the accompanying drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein to allow a service provider supporting applications running on a client device to remotely disable the applications, features of the applications, or sessions of the applications running on the client device. The service providers may initiate the disable action automatically upon the detection of certain events on or through the client device without requiring user input. Alternatively, the user may request that the service provider take the action to disable the application. The disable action is specific for the client device on or through which the detected events occur, or for which the user has requested the disable action. As such, a user who has multiple client devices may have an application, features, or session of the application disabled on only one device without affecting the other devices.

A service provider may remotely disable certain features of an application running on a client device when the features are no longer supported. For example, a client device may have a version of an application hosted on an operating system (OS). The service provider may choose not to support certain features of the application because the application version and/or the hardware/software platform on which the application is hosted are out of date. The service provider receives information on the application and the platform from the client device when the user logs into the service provider. Upon determining that a subset of features for application running on the client device is not supported, the service provider may command the client device to disable the subset of features. By disabling the unsupported features remotely and automatically from the service provider, the service provider removes the burden for disabling unsupported features of the application from the user. It also benefits the service provider by streamlining support and logistics.

A service provider may also remotely disable an application running on a client device to prevent fraudulent use or a security breach. For example, the service provider may detect that a user is attempting to hack into or tamper with secure areas of systems operated by the service provider. The service provider may make a risk assessment to determine the level of risk associated with the detected activity and disable features of the application corresponding to the risk level. Thus, the service provider may preemptively abort suspicious activities before any harm is done.

A service provider may remotely disable one or more applications and/or one or more features on a specific user device. For example, if the user is traveling out of the country, the service provider may disable any "quick pay" features on the mobile device, but still enable this quick pay feature on the user's home and office devices. This may be initiated through the user communicating travel information to the service provider or the service provider detecting that the particular mobile device is out of the country.

Alternatively, the user may request that the service provider disable an application, certain features of an application, or a live session of the application running on a client device. For example, a user who lost a client device may request that the service provider disable the application on the client device to prevent unauthorized use of the application. Upon authenticating the user, the service provider may command the application to shut down.

Figure 1:
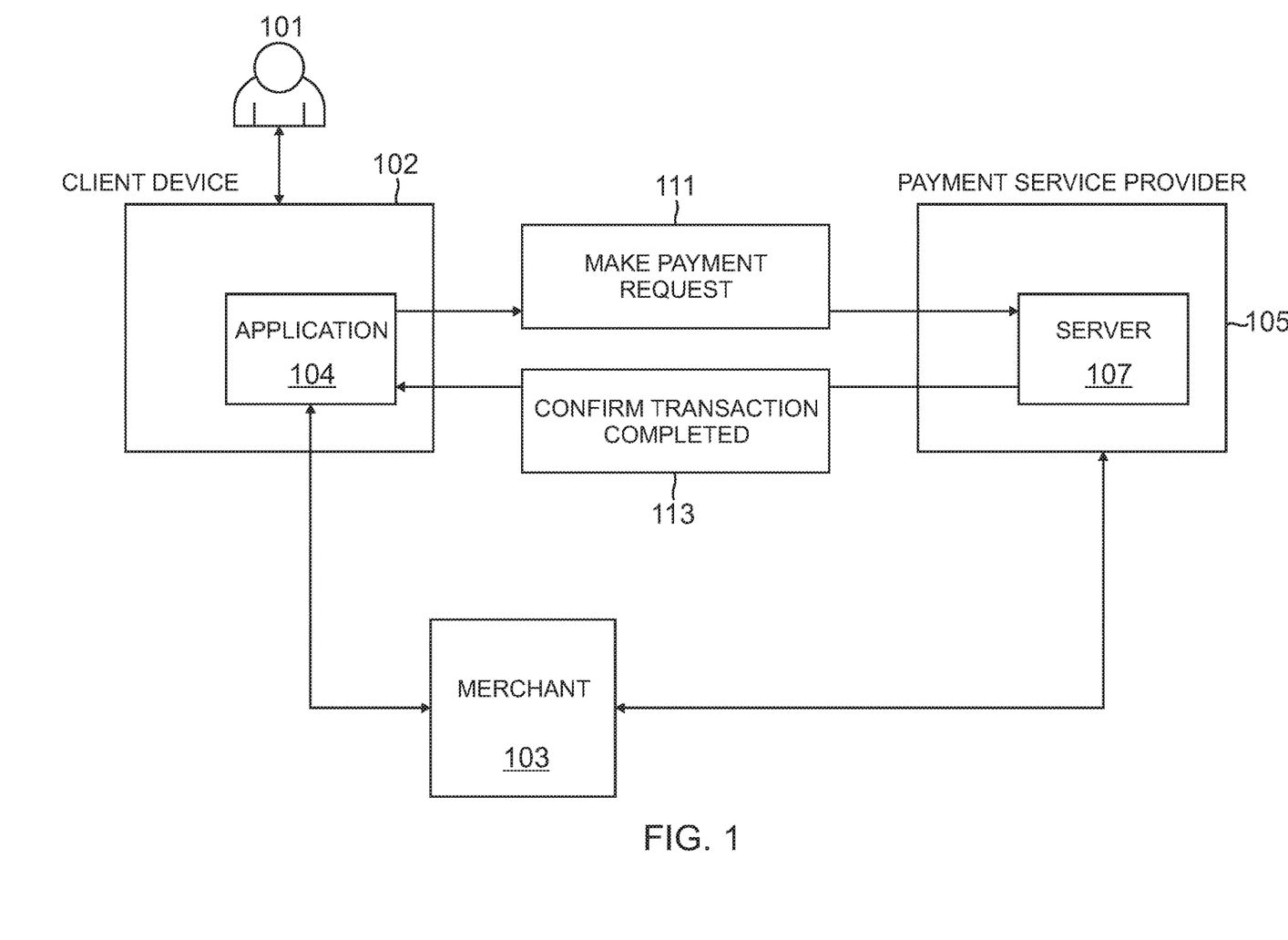
FIG. 1 shows a system for online transactions between a user running an application on a client device, a payment service provider, and a merchant according to one or more embodiments of the present disclosure.

Refer now to the figures wherein the drawings are for purposes of illustrating embodiments of the present disclosure only, and not for purposes of limiting the same. FIG. 1 shows a system for online transactions between a user running an application on a client device, a payment service provider, and a merchant according to one or more embodiments of the present disclosure.

A user 101 uses a client device 102 to conduct online transactions with a merchant 103 and a payment service provider 105. Client device 102 may be a smart phone (e.g., iPhone, Google phone, or other phones running Android, Window Mobile, or other operating systems), a tablet computer (e.g., iPad, Galaxy), personal digital assistant (PDA), a notebook computer, and various other types of wireless or wired computing devices. Payment service provider 105 provides payment services running on a server 107 or other network server devices to facilitate payment transactions between user 101 and merchant 103. One such payment service provider 105 is PayPal Inc. of San Jose, Calif. Server 107 may include one or more processors executing instructions stored on one or more memories to process the payment transactions. Subscribers of the payment services include user 101 and merchant 103 who have established accounts with payment service provider 105 to process payments.

Client device 102, merchant 103, and payment service provider 105 may communicate with each other through a network. The network may be implemented as a single network or a combination of multiple networks. For example, in various embodiments, the network may include the Internet, intranets, wireless communication networks (e.g., cellular phone networks), landline networks, and/or other appropriate types of communication networks. As such, in various embodiments, client device 102, server 107 of payment service provider 105, or server devices of merchant 103 may be associated with a particular link (e.g., a link, such as a URL (Uniform Resource Locator) to an IP (Internet Protocol) address).

Client device 102 includes an application 104 such as a payment acceptance application from payment service provider 105. User 101 may run application 104 on client device 102 to conduct transactions such as financial transactions (e.g., shopping, purchasing, bidding, etc.) with merchant 103 and with payment service provider server 105 over the network. For example, application 104 may provide a user interface for user 101 to log into the user's account with payment service provider 105 and to enter order and billing information related to the purchase such as a buyer's credit card or bank account information for processing. Application 104 may include features that facilitate payment transactions such as a "quick" feature that allows user 101 to initiate a payment transaction without going through extra authentication steps.

When user 101 is ready to make a purchase, user 101 may initiate a payment request 111 from application 104 to server 107. Server 107 may authenticate the identify of user 101, verify the sufficiency of fund in the user's account, debit the purchase amount from the user's account and credit the purchase amount to the seller's account. Upon completing the payment transactions, server 107 may notify merchant 103 that merchant's account has been credited with the purchase amount. Similarly, server 107 may issue a confirm message 113 to application 104 to inform user 101 that the payment transaction has been completed.

Figure 2:
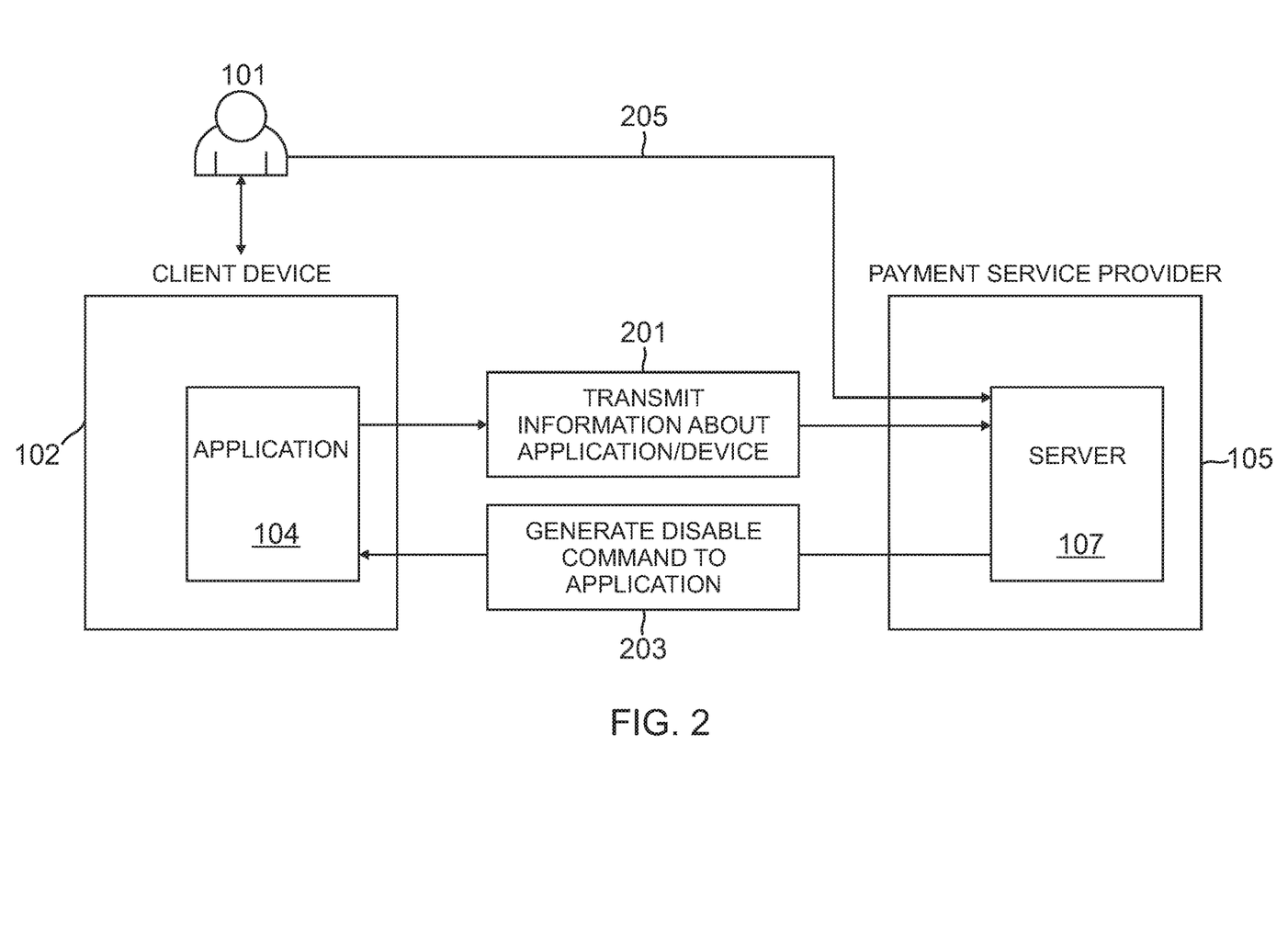
FIG. 2 shows a system for a payment service provider to remotely disable an application running on a client device according to one or more embodiments of the present disclosure.

FIG. 2 shows a system for a payment service provider 105 to remotely disable an application 104 running on a client device 102 according to one or more embodiments of the present disclosure. User 101 launches application 104 running on client device 102 to communicate with server 107 of payment service provider 105. Payment service provider 105 may disable the entire feature sets of application 104, disable only certain features of application 104, terminate a live session running application 104, or otherwise cause application 104 to deviate from a normal operation. Payment service provider 105 may disable application 104 automatically upon the detection of certain conditions or alternatively, when requested by user 101. There are various scenarios under which payment service provider 105 may disable application 104.

Payment service provider 105 may disable an entire feature set of application 104 so as to prevent application 104 from being launched when application 104 hosted on a specific hardware/operating system (OS) platform is no longer supported. For example, payment service provider 105 may cease to support an old version of application 104 hosted on a certain model of client device 102 running a certain version of OS due to obsolescence, design flaws, security concerns, performance issues, etc. Payment service provider 105 may also disable an entire feature set of application 104 when it detects conditions indicating suspicious activities, such as attempts to breach the data security or system integrity of server 107. Payment service provider 105 may run a risk assessment of the threat posed by the conditions and may shut down application 104 in its entirety if the threat is severe enough to warrant such action. Other circumstances in which payment service provider 105 may completely disable application 104 includes when user 101 has lost client device 102 and requests server 107 to shut down application 104 to prevent unauthorized use.

Application 104 may transmit to server 107 information about application 104 and the platform on which application 104 is hosted in 201. This information may include version of application 104, version of OS, type, model number, and IP address of client device 102, etc. If payment service provider 105 determines that application 104 is to be disabled, server 107 may transmit a disable command to client device 102 in 203. Server 107 may transmit the disable command while application 104 is logged onto server 107. Client device 102 may then display a message notifying user 101 that application 104 will be disabled and may terminate the session. Alternatively, server 107 may transmit the disable command when application 104 is offline to prevent user 101 from launching application 104.

Payment service provider 105 may also disable only a subset of the available features of application 104 according to a set of predefined rules. Payment service provider 105 may use the set of predefined rules to determine what subset of features to disable based on information received from client device 104 such as the version of application 104 and the configuration of the hardware/OS platform on which application 104 is hosted. For example, client device 102 may have a video display resolution that is not supported by payment service provider 105. Application 104 may transmit to server 107 in 201 configuration information of client device 102 in addition to information concerning features of application 104 that are enabled. Payment service provider 105 may use the set of predefined rules based on the received information to determine that client device 102 has an unsupported display resolution. If the unsupported display resolution is enabled in application 104, server 107 may transmit a command to client device 102 in 203 to disable the unsupported display resolution but leave all other features enabled on application 104.

As another example, application 104 may be configured to have a different feature set for different countries. Different countries may also have different laws regulating the type or the maximum amount of online payment transaction allowed. Application 104 may transmit to server 107 in 201 information on the location of client device 102. Such positioning information may be obtained by a GPS-equipped client device 102. Alternatively, the approximate positioning information of client device 104 may be provided to payment service provider 105 by an operator of the communication network, such as a cellular carrier or an Internet service provider. Positioning information may also be derived by payment service provider 105 from the IP address of the gateway from which IP packets from client device 102 originate. Based on the received information, payment service provider 105 may determine the country in which client device 102 is located. Payment service provider 105 may determine from the set of predefined rules the feature set that is specific to the country. Server 107 may transmit a disable command to client device 102 in 203 to disable features that are not in this feature set. Subsequently, when payment service provider 105 detects that client device 102 is outside of that country, payment service provider 105 may transmit a command to enable the features that were previously disabled or to transmit another disable command to disable features specific to the new country. As yet another example, if payment service provider 105 detects that client device 102 is outside of a pre-assigned home country or detects an unusual pattern of activities requested by user 101, payment service provider 105 may disable certain features such as a quick pay feature so as to require user 101 to go through extra authentication steps to authorize a payment transaction. Alternatively, user 101 may transmit user's travel information in 201 to payment service provider 105 for payment service provider 105 to disable features such as the quick pay feature.

Payment service provider 105 may also terminate a live session of application 104 running on client device 102. For example, if user 101 is logged into a session of application 104 but has misplaced client device 102, user 101 may contact payment service provider 105 in 205 to request that application 104 be remotely logged out of its session to prevent unauthorized use. Server 107 may transmit a disable command to client device 102 in 203 to terminate the session.

Figure 3:
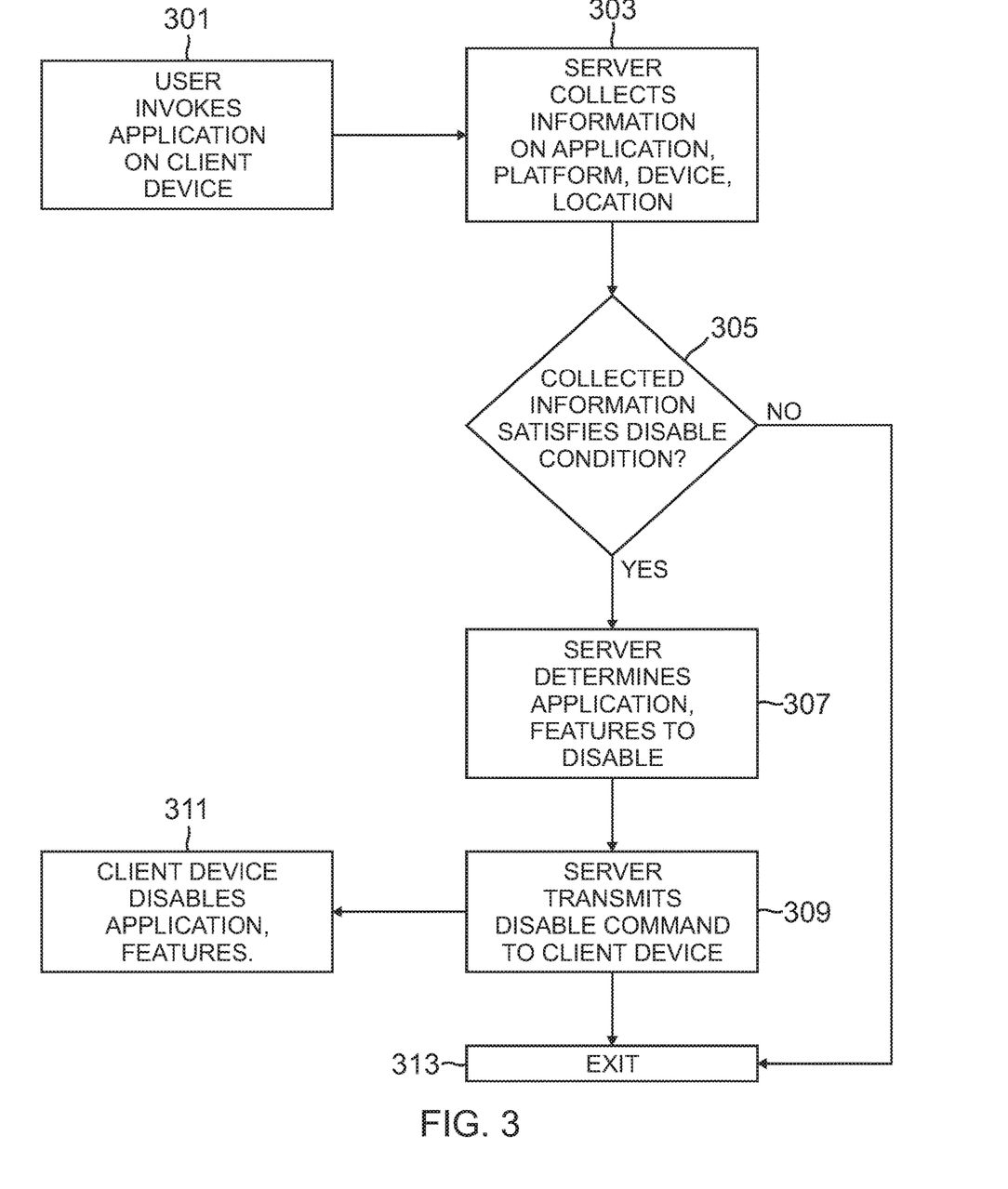
FIG. 3 shows transactions between the client device and the payment service provider of FIG. 2 when the payment service provider remotely disables the application without user input according to one or more embodiments of the present disclosure.

FIG. 3 shows transactions between the client device 102 and the payment service provider 105 of FIG. 2 when the payment service provider remotely disables the application 104 without input from user 101 according to one or more embodiments of the present disclosure. In 301, user 101 invokes application 104 on client device 102 to log into server 107 of payment service provider 105. In 303, server 107 collects from client device 102 configuration information of application 104, such as the software/hardware platform on which application 104 is hosted, other information on client device 102, etc. in addition to the types of transactions requested by application 104. For example, server 107 may collect the version of application 104 and the version of OS running on client device 102, the type, model number and IP address of client device 102, features of application 104 that are currently enabled, positioning information of client device 102, . . . etc. In 305, payment service provider 105 uses the collected information and a set of predefined rule to determine if any feature of application 104 is to be disabled. For example, payment service provider 105 may determine from the version of application 104, the version of OS, and the type and model of client device 102 that an obsolete feature set of application 104 is to be disabled. In 305, payment service provider 105 may also run a risk assessment on transaction requests from application 104 to determine if any features of application 104 are to be disabled to protect the data security or system integrity of server 107.

If payment service provider 105 determines that no part of application 104 is to be disabled, it exists in 313. Otherwise, in 307, payment service provider 105 may use the set of predefined rules to determine the feature set of application 104 to be disabled. The set of predefined rules may be a function of the information collected from client device 102, such as the version of application 104, the version of OS, the type, model, and positioning information of client device 102, and features of application 104 currently enabled. For example, payment service provider 105 may determine from the set of predefined rules based on configuration information of application 104 that client device 102 has an unsupported display resolution that is currently enabled but needs to be disabled. In another example, payment service provider 105 may determine from the set of predefined rule based on positional information that a quick pay feature is to be disabled so as to require user 101 to go through extra authentication steps to authorize a payment transaction because client device 102 is outside of a pre-assigned home country.

The set of predefined rules may also be a function of the type and level of threats from the risk assessment of 305. For example, payment service provider 105 may determine from the set of predefined rules that application 104 in its entirety is to be disabled due to a high level security threat posed by detected activities.

In step 309, server 107 transmits a disable command to client device 102. The disable command may specify the feature set of application 104 to be disabled or that application 104 in its entirety is to be disabled. Server 107 may transmit the disable command while application 104 is online or offline Note that the disable command is only specific to a client device, not specific to a user. Therefore, if user 101 has two client devices of different configurations, application 104 may be disabled only on one client device but remains active in the other client device. In 311, client device 102 disables the feature set of application 104 as commanded. If a subset of features is disabled, user 101 will still be able to launch application 104 but the disabled features will not be active. If application 104 is online when the subset of features is disabled, application 104 may display a notification message to user 101 that the subset of features will be disabled. Alternatively, if application 104 in its entirety is disabled, user 101 will be prevented from launching application 104. If application 104 is online, user 101 may be logged out and the session terminated.

Figure 4:
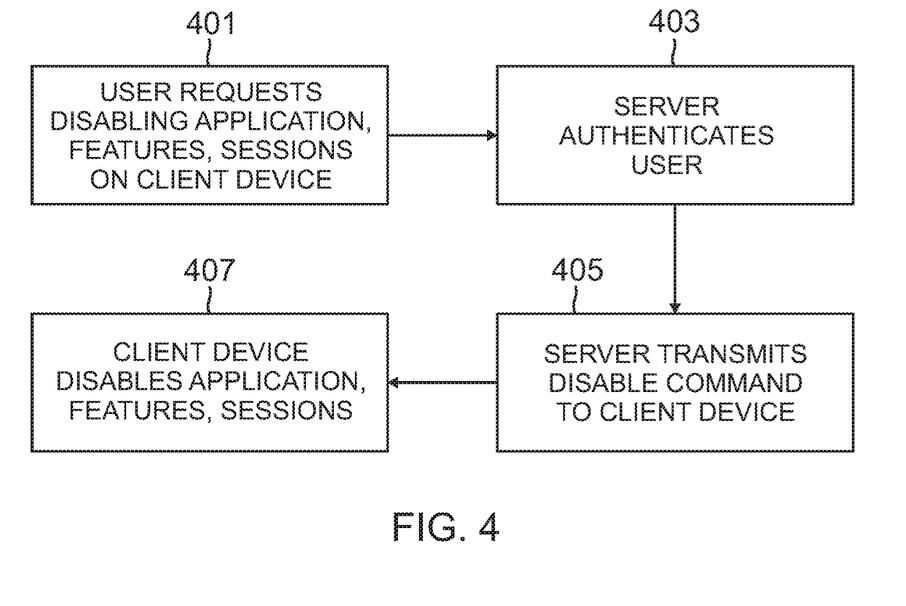
FIG. 4 shows transactions between the user, the client device, and the payment service provider of FIG. 2 when the user requests the payment service provider to remotely disable the application according to one or more embodiments of the present disclosure.

FIG. 4 shows transactions between the user 101, the client device 102, and the payment service provider 105 of FIG. 2 when the user requests the payment service provider to remotely disable the application 104 according to one or more embodiments of the present disclosure. In 401, user 101 makes requests to payment service provider 105 to disable application 104 or a subset of features of application 104, or to terminate a live session of application 104 running on client device 102. User 101 may make the request from the client device running the application 104 to be disabled or terminated. Alternatively, user 101 may make the request from a different client device. For example, if user 101 has lost client device 102, user 101 may launch the application on a second client device to request payment service provider 105 to disable application 104 on client device 102 to prevent unauthorized use. In another example, if user 101 is logged into a session of application 104 but has misplaced client device 102, user 101 may similarly launch the application on a second client device to request payment service provider 105 to terminate the session on client device 102.

In 403, server 107 authenticates user 101 to verify the identify of user 101 making the request. For example, if user 101 requests from a first client device that application 104 or a subset of features of application 104 running on a second client device be disabled, or that a session running application 104 on a second client device be terminated, server 107 may require user 101 to answer a series of security questions to verify the authenticity of the request. In step 405, server 107 transmits a disable command to client device 102. The disable command may specify the feature set of application 104 to be disabled or that application 104 in its entirety is to be disabled, or that a live session of application 104 is to be terminated. In 407, client device 102 disables the features of application 104 or terminates the live session as commanded. If user 101 makes the request in 401 from the client device 102 hosting the application 104 whose subset of features or whose entire feature set is to be disabled, application 104 may display a message notifying user 101 of the feature set to be disabled. If the request is made from a different client device, no notification may be given before client device 104 disables the features or terminates the session.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as program code and/or data for processing the payment or money transfer request, may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, use of a non-alphanumeric access code with a phone client is described; however other types of access code may also be suitable for use on other types of hardware platform. In addition, although PayPal is used as the payment service provider in the embodiments, any suitable on-line payment provider or financial services provider may be used to process pre-approval, payment, or money transfer requests from the hardware platform. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

I claim:

1. A system comprising:
a non-transitory memory; and
one or more hardware processors coupled to the non-transitory memory and configured to read instructions from the non-transitory memory to cause the system to perform operations comprising:
determining application usage data for an application on a mobile device of a user;
determining that the application usage data indicates an attempt to breach data security on the mobile device;
in response to the determining that the application usage data indicates the attempt to breach the data security, communicating the application usage data to a remote computing device designated by the user to receive the application usage data;

receiving, from the remote computing device, a request to disable an application feature of the application running on the mobile device based on the application usage data;

authenticating the request;

in response to the authenticating, remotely disabling the application feature of the application based on the application usage data without user input from the mobile device; and in response to the remotely disabling, requesting, from the mobile device, an authentication credential for reactivating the application feature.

2. The system of claim 1, wherein the operations further comprise:

determining that the application usage data meets a predefined set of rules for application configuration, wherein the communicating is further done in response to the determining that the application usage data meets the predefined set of rules.

3. The system of claim 2, wherein the operations further comprise:

responsive to the determining that the application usage data meets the predefined set of rules, identifying the application feature of the application based on the predefined set of rules, wherein the application feature is communicated to the remote computing device with the application usage data.

4. The system of claim 1, wherein the operations further comprise:

determining a plurality of application features associated with the application feature, wherein the remotely disabling comprises remotely disabling the plurality of application features associated with the application feature.

5. The system of claim 1, wherein the operations further comprise:

receiving an electronic transaction processing request using an account linked to the application, wherein the determining the application usage data comprises automatically detecting the application usage data based on the receiving the electronic transaction processing request.

6. The system of claim 1, wherein the remotely disabling is performed while allowing access to at least one of other data or another application feature on the mobile device.

7. The system of claim 1, wherein the operations further comprise:

causing to be displayed, through an interface of the mobile device, a notification of active application features and disabled application features based on the remotely disabling.

8. The system of claim 1, wherein the remotely disabling comprises ending a live session of the application on the mobile device.

9. A method comprising:

detecting, by a service provider, application feature data for a software application on a computing device of a user via a remote connection to the computing device, wherein the application feature data is associated with an application feature provided by the software application;

determining that the application feature is not supported by the service provider for the computing device;

disabling, by the service provider over a network connection with the computing device, the application feature remotely without user input based on the determining;

determining that the application feature data indicates an attempt to breach data security on the computing device;

in response to the determining that the application feature data indicates the attempt to breach the data security, communicating an alert to the computing device of the disabling; and in response to the disabling the application feature remotely, requesting, from the computing device, an authentication credential for enabling the application feature.

10. The method of claim 9, wherein the determining that the application feature is not supported comprises determining that a version date of at least one of the software application or the application feature is past an application support date set by the service provider.

11. The method of claim 9, wherein the determining that the application feature is not supported comprises determining that at least one of hardware on the computing device or another software application on the computing device is unsupported by the service provider.

12. The method of claim 9, wherein the disabling the application feature comprises preventing the application feature from accessing one of user personal data or user financial data on the computing device.

13. The method of claim 9, further comprising:

determining a location of the computing device, wherein the determining that the application feature is not supported is further based on the location.

14. The method of claim 9, further comprising:

communicating the application feature data to the computing device; and receiving a request to check a version of the software application for support, wherein the determining that the application feature is not supported comprises determining that the version of the software application is not supported.

15. A non-transitory machine-readable medium having stored thereon machine-readable instructions executable to cause a machine to perform operations comprising:

receiving, by an online transaction processor, application data for a transaction processing application on a mobile device of a user over a network, wherein the application data is associated with an electronic transaction processable through an application feature provided by the transaction processing application;

determining a risk level for the electronic transaction based on the application data;

preventing processing of the electronic transaction through the application feature based on the risk level;

determining that the application data indicates an attempt to breach data security on the mobile device;

in response to the determining that the application data indicates the attempt to breach the data security, communicating an alert associated with the mobile device;

deactivating the application feature remotely without user input based on the determining; and in response to the deactivating the application feature remotely, requesting, from the mobile device, an authentication credential reactivating for the application feature.

16. The non-transitory machine-readable medium of claim 15, wherein the preventing is further based on a set of pre-defined rules, wherein the set of pre-defined rules is a function of a type of threat and the risk level.

17. The non-transitory machine-readable medium of claim 15, wherein the operations further comprise:
   aborting an activity associated with at least one of the application feature or the electronic transaction in the transaction processing application,
   wherein the deactivating the application feature is done in response to the aborting.

18. The non-transitory machine-readable medium of claim 17, wherein the activity comprises a request to access one of funds or a payment instrument through the transaction processing application.

19. The system of claim 1, wherein the operations further comprise:
   receiving the authentication credential from the mobile device; and
   reactivating the application feature in response to the receiving the authentication credential.

20. The non-transitory machine-readable medium of claim 15, wherein the attempt to breach the data security comprises an unauthorized login to the transaction processing application on the mobile device.

\* \* \* \* \*